US008248711B2

(12) United States Patent
Li et al.

(10) Patent No.: US 8,248,711 B2
(45) Date of Patent: Aug. 21, 2012

(54) ZOOM LENS

(75) Inventors: Zi-Yuan Li, Guangdong (CN); Bin Lei, Guangdong (CN); Xiao-Tian Kang, Guangdong (CN); Long-Liang Zou, Guangdong (CN); Jian-Jun Zhang, Guangdong (CN); Jun-Jie Li, Guangdong (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 346 days.

(21) Appl. No.: 12/699,886

(22) Filed: Feb. 4, 2010

(65) Prior Publication Data
US 2011/0149414 A1 Jun. 23, 2011

(51) Int. Cl.
*G02B 15/14* (2006.01)
(52) U.S. Cl. .......................... 359/696; 359/739
(58) Field of Classification Search .................. 359/227, 359/696, 739; 396/458; 348/340
See application file for complete search history.

(56) References Cited

U.S. PATENT DOCUMENTS

| 2004/0258405 A1* | 12/2004 | Shiratori et al. | 396/458 |
| 2006/0008270 A1* | 1/2006 | Naganuma | 396/469 |
| 2009/0040361 A1* | 2/2009 | Heim et al. | 348/340 |

FOREIGN PATENT DOCUMENTS
CN 101520550 A 9/2009
* cited by examiner

*Primary Examiner* — Scott J Sugarman
*Assistant Examiner* — Vipin Patel
(74) *Attorney, Agent, or Firm* — Altis Law Group, Inc.

(57) ABSTRACT

A zoom lens includes a lens, a shutter-aperture, a moving barrel and a resisting ring. The lens includes a curved surface. The shutter-aperture includes a diaphragm for allowing light rays passing through and at least three blind holes. The moving barrel includes a bottom plate, a securing portion for securing the lens, at least three protrusions surrounding the securing portion and at least three elastic elements sleeved on the protrusions respectively. The securing portion and the at least three protrusions extend towards the object-side from the bottom plate. The resisting ring is disposed on an end of the moving barrel opposite to the bottom plate. The aperture-shutter is received in the moving barrel and the movement of the aperture-shutter is bounded by the resisting ring. When the zoom lens contracts, the protrusions are received in the blind holes correspondingly and the lens is received in the diaphragm.

10 Claims, 6 Drawing Sheets

ZOOM LENS

BACKGROUND

1. Technical Field

The present disclosure relates to lenses and, particularly, to a zoom lens.

2. Description of Related Art

Zoom lenses commonly include a lens barrel, an aperture-shutter, and a number of lenses. The aperture-shutter and the lenses are received within the lens barrel and arranged along the optical axis of the zoom lens. The lens barrel can extend (with desired lenses) to obtain a desired focal length when focusing, and contract to be received in the camera body when not in use. However, in many cases, the contracted length of a zoom lens is still longer than the total thicknesses of the aperture-shutter and the lenses, making it impossible to further shorten the overall length of the zoom lens.

Therefore, it is desirable to provide a zoom lens, which can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
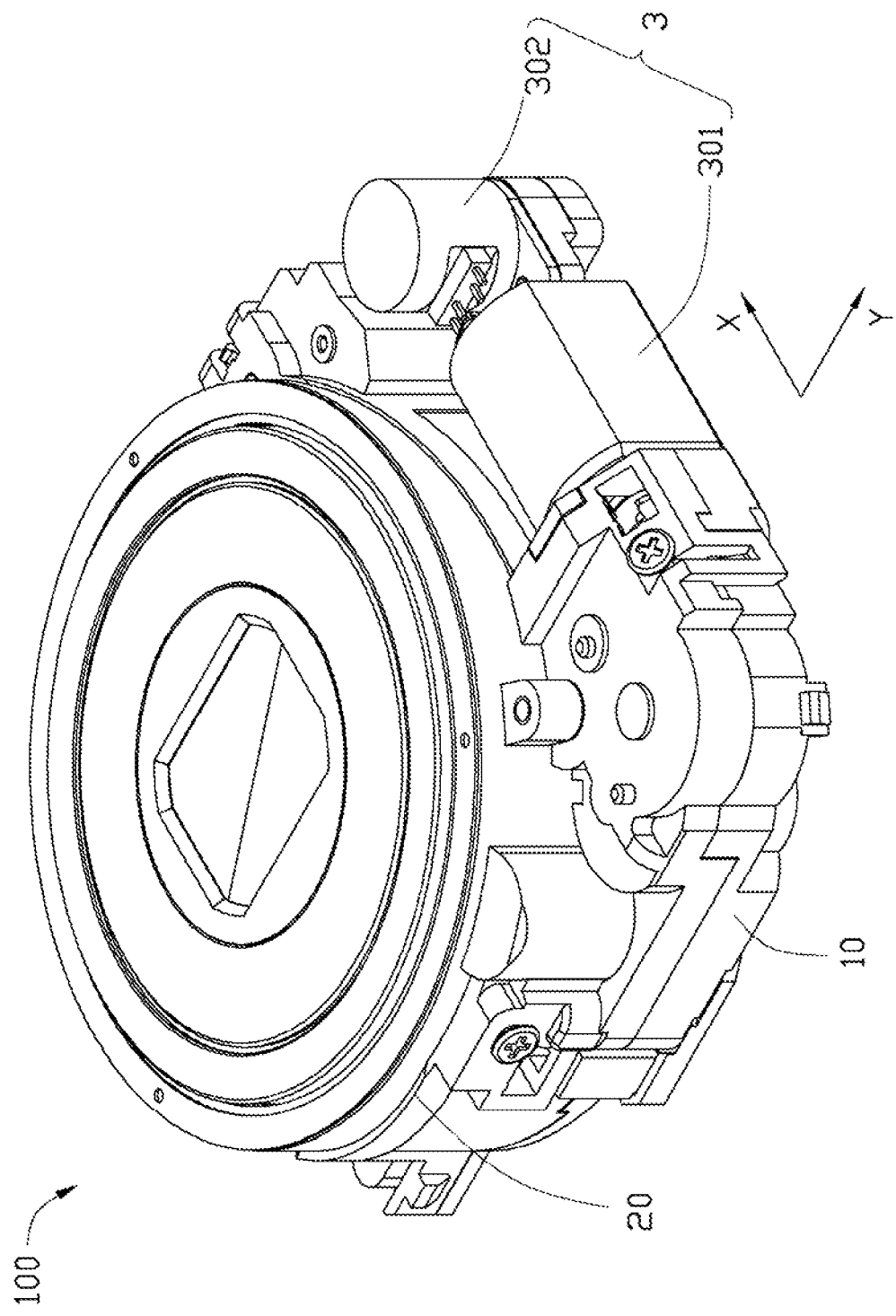
FIG. 1 is an isometric, assembled view of a zoom lens, according to an exemplary embodiment.
Figure 2:
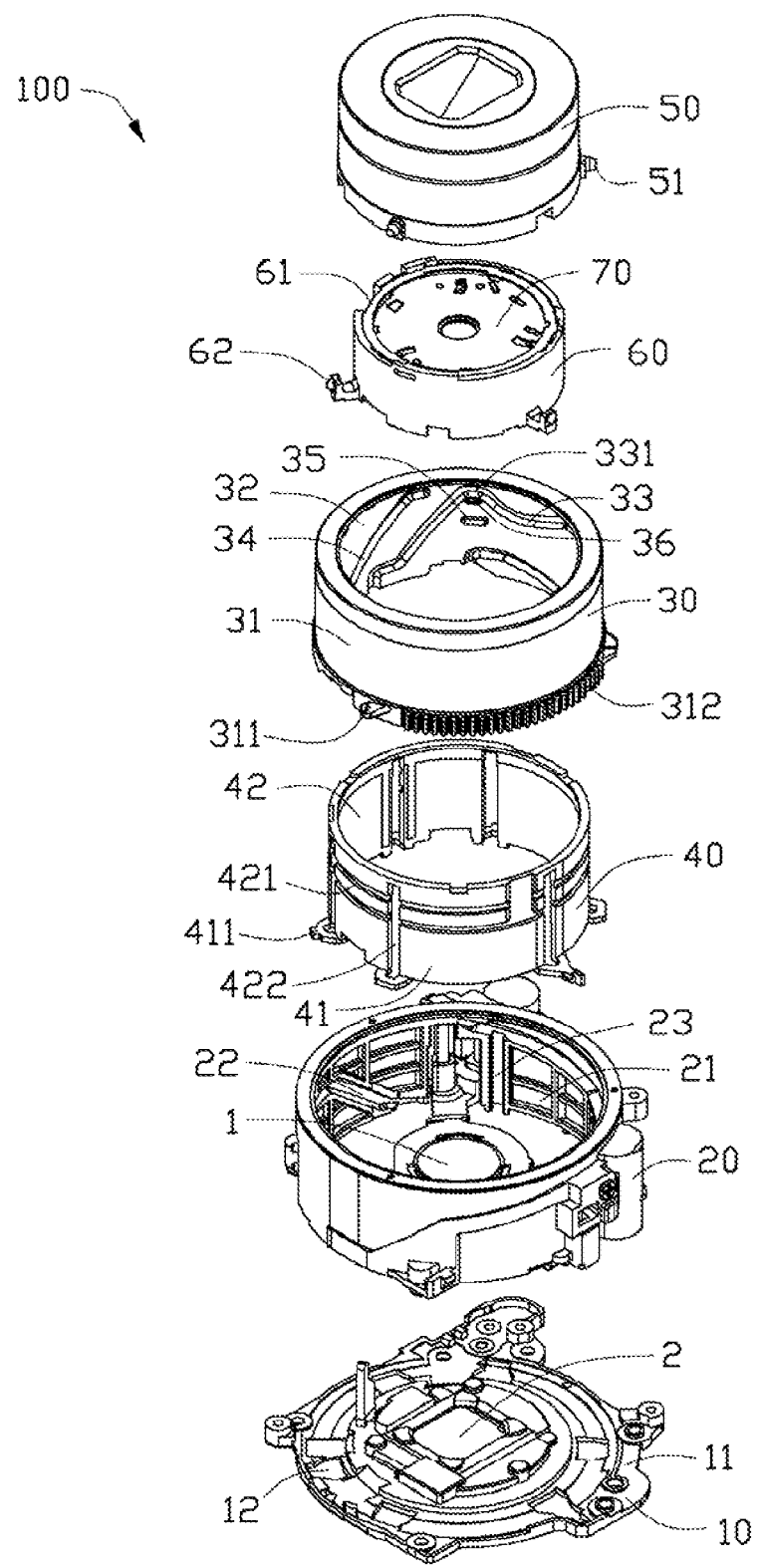
FIG. 2 is an isometric, exploded view of the zoom lens of FIG. 1.

Referring to FIGS. 1-2, a zoom lens 100 for an image capturing device, according to an exemplary embodiment, includes a plurality of lenses 1, an image sensor 2, a driving device 3, a base 10, a fixing barrel 20, a cam barrel 30, a guiding barrel 40, a zoom barrel 50, a moving barrel 60, and an aperture-shutter 70. The lenses 1 are coaxially received in the fixing barrel 20, the zoom barrel 50, and the moving barrel 60 correspondingly.

The base 10 includes a supporting surface 11. The image sensor 2, the driving device 3, and the fixing barrel 20 are supported on the supporting surface 11. The image sensor 2 is aligned with the lenses 1 to sense the light rays from the lenses 1 and transform the light rays to electrical image signals. The driving device 3 includes a direct current (DC) motor 301 and a step motor 302. The DC motor 301 is configured for driving the cam barrel 30 to rotate for zooming. The step motor 302 is configured for driving the cam barrel 30 to rotate for focusing. The DC motor 301 and the step motor 302 are disposed at a same side of the fixing barrel 20 to reduce the size of the zoom lens 100 along an XY-axis as shown in FIG. 1. The base 10 defines three openings 12 surrounding the image sensor 2.

The fixing barrel 20 includes an inner sidewall surface 21 which defines three first guiding slots 22 and three second guiding slots 23. The first guiding slots 22 and the second guiding slots 23 are alternately arranged. The first guiding slots 22 are arranged at equal distances and extend upwards and to the left (i.e., towards the object-side of the zoom lens 100). The second guiding slots 23 are parallel and arranged at equal-distances, extending upwards.

The cam barrel 30 is received in the fixing barrel 20 and configured for, rotating, bringing the zoom barrel 50 and the moving barrel 60 to move along the optical axis of the zoom lens 100. The cam barrel 30 includes an outer side surface 31 and an inner side surface 32. Three first sliding pins 311 extend outwards from the bottom (i.e., the image-side end of the cam barrel 30) of the outer side surface 31 along the radius of the cam barrel 30 and are arranged at equal distances. The first sliding pins 311 are slidably received in the first sliding slots 22 correspondingly. A gear 312 is coaxially fixed to the bottom of the outer surface 31 and meshed with gears (not shown) of the DC motor 301 and the step motor 302. When the cam barrel 30 is driven by the DC motor 301 or the stop motor 302 to rotate, the cam barrel 30 is guided by the first sliding slots 22 to move along the optical axis of the zoom lens 100. The inner surface 32 defines three first cam slots 33 and three second cam slots 34. The first cam slots 33 and the second cam slots 34 are alternately arranged. The first cam slots 33 are arranged at equal distances and extend upwards and to the right to form an end portion 331 adjacent to the upper end of the cam barrel 30 (i.e., the image-side end of the cam barrel 30) and then extend downwards and to the right. The second cam slots 34 are arranged at equal distances too and extend upwards (nearly to the upper end of the cam barrel 30) and to the right. Three position blocks 35 and three reinforcing blocks 36 are disposed on the inner surface 32. Each reinforcing block 36 is disposed beneath the end portion 331 to reinforce the end portion 331. As such, the end portion 331 is more wearable by a first cam pin 51 (see below).

The guiding barrel 40 is partially received in the cam barrel 30 and includes an external side surface 41 and an internal side surface 42. The bottom of the guiding barrel 40 (i.e., the image-side end of the guiding barrel 40) protrudes outside the bottom of the cam barrel 30. Three second sliding pins 411, extend outwards from the bottom along the radius direction of the guiding barrel 40 and are slidably received in the second sliding slots 23 respectively. The external side surface 41 defines two first slots 421 through the guiding barrel 40, along the circumferential direction of the guiding barrel 40 and six second slots 422 through the guiding barrel 40 along the longitude of the guiding barrel 40 and arranged at equal-distances.

The zoom barrel 50 is received in the guiding barrel 40. Three first cam pins 51 extend outwards from the bottom of the external sidewall of the zoom barrel 50, and protrude through three corresponding second slots 422 and are slidably received in the first cam slots 33 correspondingly. In use, the first cam pin 51 is supported by the end portion 36, and therefore the end portion 331 is worn out quicker compared to other portions of the first cam slot 33. As such, the reinforcing block 36 is positioned under end portion 331 to reinforce the end portion 331, therefore, the end portion 331 becomes more durable, and service time thereof is efficiently prolonged.

Figure 3:
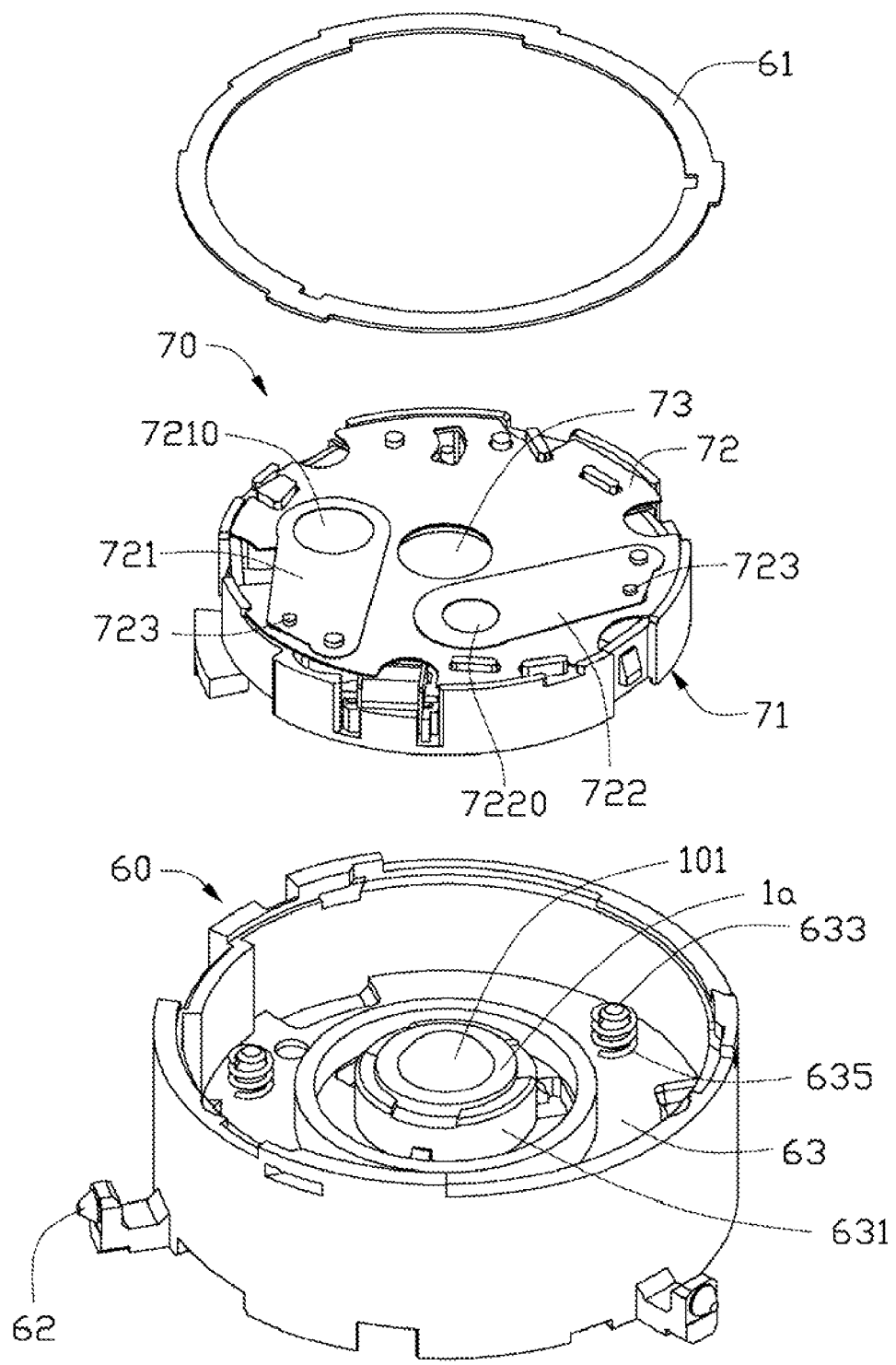
FIG. 3 is an isometric, exploded view of a moving barrel and an aperture-shutter of the zoom lens of FIG. 1.
Figure 4:
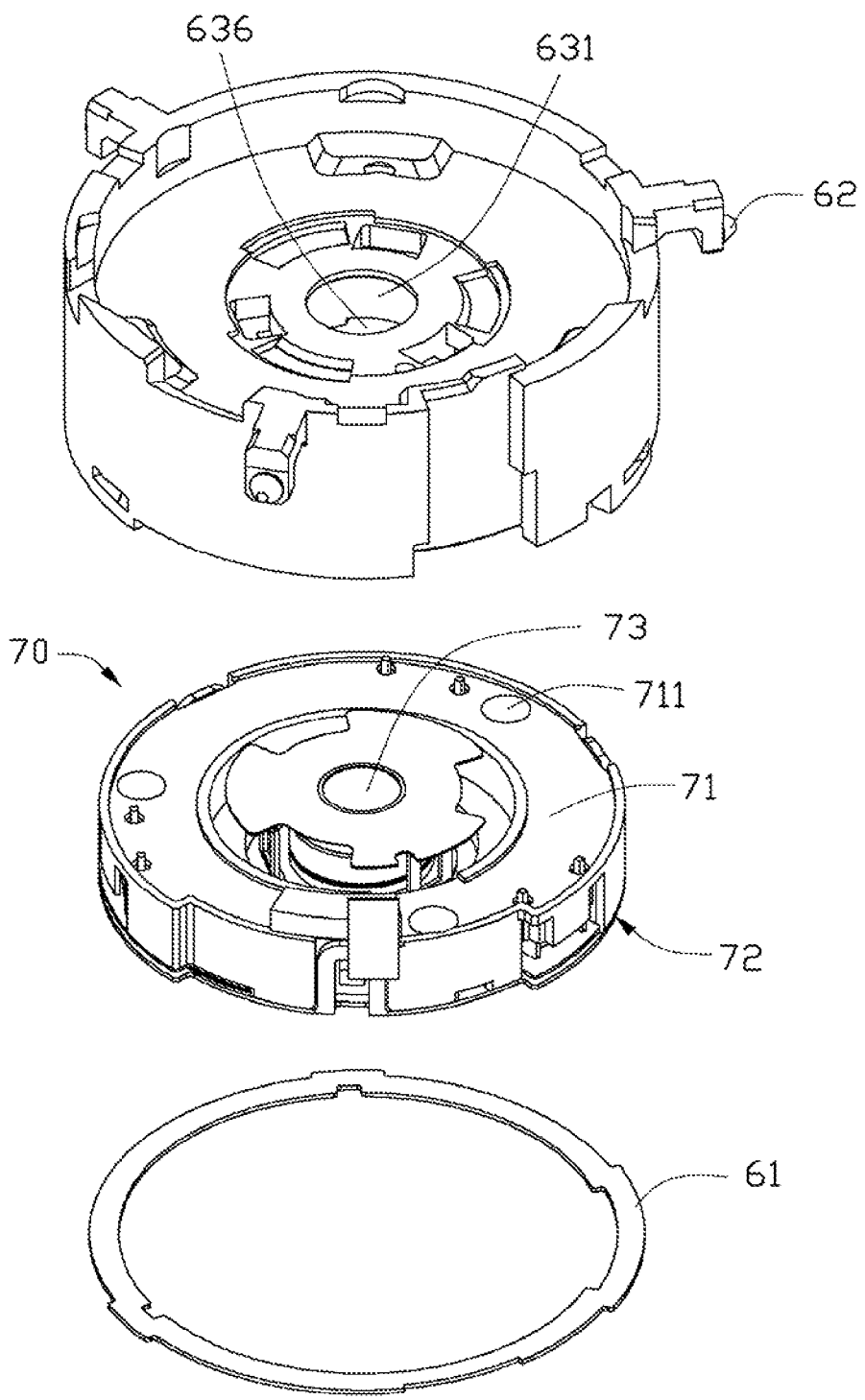
FIG. 4 is another isometric, exploded view of the moving barrel and the aperture-shutter of FIG. 3, viewed at another angle.

Referring to FIGS. 3-4, the moving barrel 60 is received in the zoom barrel 50. Three second cam pins 62 extend outwards from the bottom (i.e., the image-side end of the moving barrel 60) of the outer side surface of the moving barrel 60 along the radius of the moving barrel 60 and protrude through the other three corresponding second slots 422 and are slidably received in the second cam slots 34 respectively. As such, the moving barrel 60 can move along the axis of the zoom lens 100 to change the distance between the lens(es) 1 received in the zoom barrel 50 and the lens(es) 1 received in the moving barrel 60 for zooming or focusing. The moving barrel 60 includes a bottom plate 63, a securing portion 631, three protrusions 633, and three elastic elements 635. The bottom plate 63 defines a through hole 636 in the center. The lens(es) 1 is disposed on the bottom plate 63 to seal the hole 636. The securing portion 631 is an tube that perpendicularly and coaxially extends upward (i.e., towards the object-side) from the bottom plate 63 and surrounds the hole 636. The securing portion 631 is configured for securing a lens 1a. The protrusions 633 are generally rods perpendicularly extending upwards from the bottom plate 63 and surround the securing portion 631 at equal distances. Three elastic elements 635, such as coil springs sleeve the protrusions 633 correspondingly. A resisting ring 61 is disposed on the end of the moving barrel 60 opposite to the bottom plate 63. The lens 1 includes a curved (e.g., spherical or aspherical) surface 101 protruding upwards (i.e., towards the resisting ring 61).

The aperture-shutter 70 is disk-shaped. The outer diameter of the aperture-shutter 70 is less than the moving barrel 60 but larger than the resisting ring 61. The aperture-shutter 70 is received within the moving barrel 60 and the movement thereof is bounded by the resisting ring 61. The aperture-shutter 70 includes a first surface 71 facing to the bottom plate 63 and a second surface 72 opposite to the first surface 71. The aperture-shutter 70 defines a diaphragm 73 for allowing light rays passing. The first surface 71 defines three blind holes 711 corresponding to the three protrusions 633 respectively. A first aperture sector 721, a second aperture sector 722, and two controlling switches 723 are disposed on the second surface 72. The first aperture sector 721 defines a first aperture opening 7210. The second aperture sector 722 defines a second aperture opening 7220. The diameter of the first aperture opening 7210 is larger than the second aperture opening 7220 but smaller than the diaphragm 73. The two controlling switches 723 are configured to swing the first aperture sector 721 and the second aperture sector 722 correspondingly to drive the first aperture 7210 and the second aperture 7220 to shield the diaphragm 73 or move away from the diaphragm 73.

Figure 5:
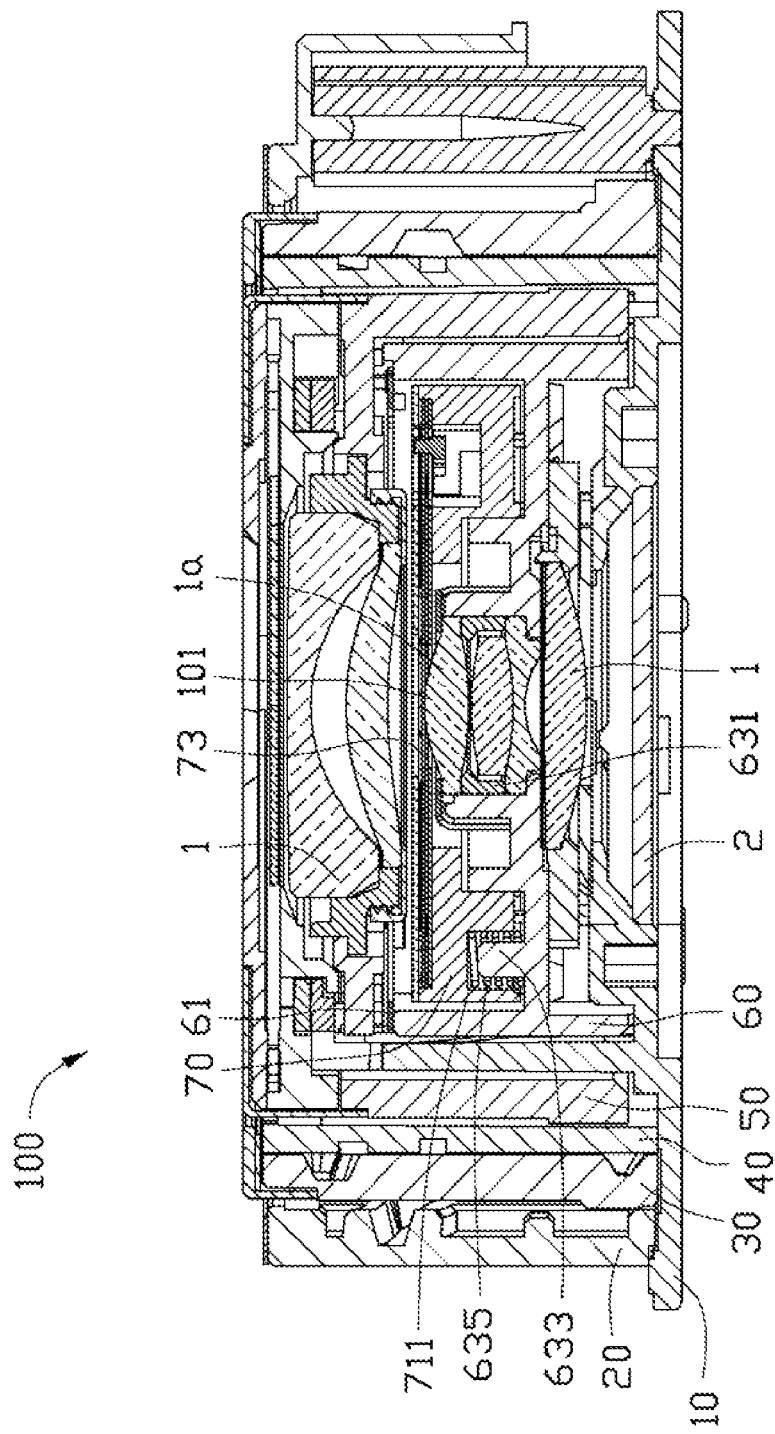
FIG. 5 is a cross-sectional view of the zoom lens of FIG. 1 which is in a contracted state.
Figure 6:
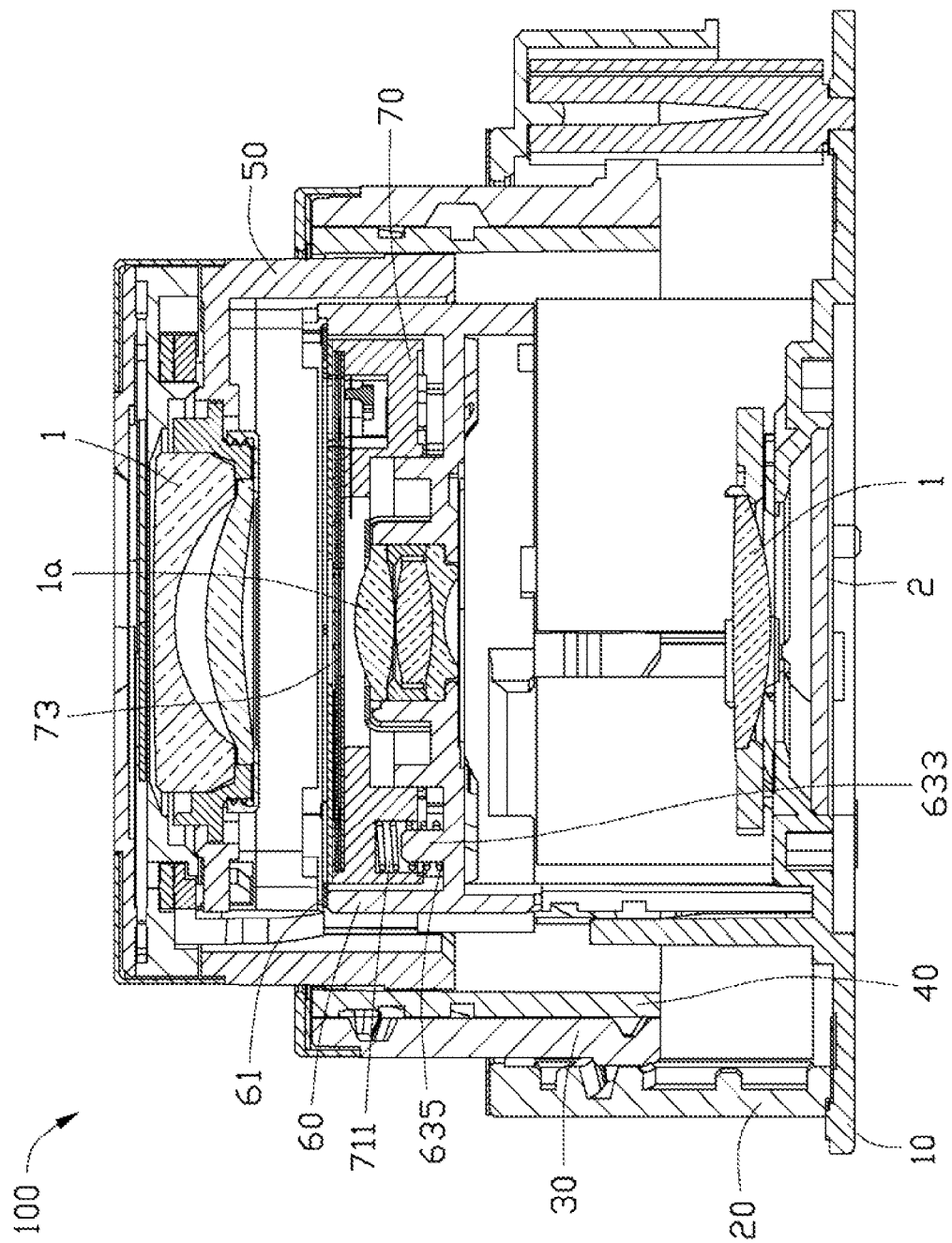
FIG. 6 is a cross-sectional view of the zoom lens of FIG. 1 which is in an extended state.

Referring to FIGS. 5-6, the area of the cross section of the curved surface 101 along the radius of the zoom lens 100 is smaller than the diameter of the diaphragm 73. The curved surface 101 of the lens 1a runs into the diaphragm 73 when the zoom lens 100 is contracted. As such, the overall length of the zoom lens 100 is reduced to be smaller than the total thickness of the lenses 1 and the aperture-shutter 70, significantly reducing the overall size of the zoom lens 100.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:
1. A zoom lens comprising:
a lens comprising a curved surface;
an aperture-shutter comprising an diaphragm for allowing light rays passing through and at least three blind holes;
a moving barrel comprising:
a bottom plate;
a securing portion extending towards the object-side from the bottom plate and configured for securing the lens;
at least three protrusions extending towards the object-side of the bottom plate and surrounding the securing portion; and
at least three elastic elements sleeved on the protrusions respectively; and
a resisting ring disposed on an end of the moving barrel opposite to the bottom plate;
the aperture-shutter being received in the moving barrel, the movement of the aperture-shutter bounded by the resisting ring; the at least three protrusions being received in the at least three blind holes correspondingly and the lens being received in the diaphragm when the zoom lens contracts.

2. The zoom lens in claim 1, wherein the aperture-shutter further comprises a first aperture sector, a second aperture sector and two controlling switches, the first aperture sector defines a first aperture opening, the second aperture sector defines a second aperture opening, the diameter of the first aperture is larger than the second aperture but smaller than the diaphragm, the two controlling switches are configured to swing the first aperture sector and the second aperture sector correspondingly to shielding the diaphragm or move away from the diaphragm.

3. The zoom lens in claim 1, wherein the zoom lens further comprises a cam barrel configured to guide the moving barrel to move along the axis of the zoom lens, the cam barrel comprises a plurality of first cam slots and a plurality of reinforcing blocks corresponding with the first cam slots, the first cam slots extend upwards to form an end portion adjacent to the image-side end of the cam barrel and then extend downwards, each reinforcing block is disposed beneath the end portion correspondingly to reinforce the end portion.

4. The zoom lens in claim 1, wherein the zoom lens further comprises a base, a fixing barrel and a driving device, the fixing barrel and the driving device are arranged on the base, the fixing barrel is configure to guide the moving barrel to move along the axis of the zoom lens, the driving device comprises a direct current motor and a step motor which are arranged on a same side of the fixing barrel.

5. The zoom lens in claim 4, wherein the zoom lens further comprises a guiding barrel, the guiding barrel is received in the fixing barrel, a plurality of second sliding pins extend outwards from the object-side end along the radius direction of the guiding barrel, the base defines a plurality of openings for receiving the second sliding pins respectively.

6. An image capturing device comprising:
a zoom lens comprising:
a lens comprising a curved surface;
an aperture-shutter comprising an diaphragm for allowing light rays passing through and at least three blind holes;
a moving barrel comprising:
a bottom plate;
a securing portion extending towards the object-side from the bottom plate and configured for securing the lens;
at least three protrusions extending towards the object-side of the bottom plate and surrounding the securing portion; and
at least three elastic elements sleeved on the protrusions respectively; and
a resisting ring disposed on an end of the moving barrel opposite to the bottom plate;

the aperture-shutter being received in the moving barrel, the movement of the aperture-shutter bounded by the resisting ring; the at least three protrusions being received in the at least three blind holes correspondingly and the lens being received in the diaphragm when the zoom lens contracts.

7. The image capturing device in claim 6, wherein the aperture-shutter further comprises a first aperture sector, a second aperture sector and two controlling switches, the first aperture sector defines a first aperture opening, the second aperture sector defines a second aperture opening, the diameter of the first aperture is larger than the second aperture but smaller than the diaphragm, the two controlling switches are configured to swing the first aperture sector and the second aperture sector correspondingly to shielding the diaphragm or move away from the diaphragm.

8. The image capturing device in claim 6, wherein the zoom lens further comprises a cam barrel configured to guide the moving barrel to move along the axis of the zoom lens, the cam barrel comprises a plurality of first cam slots and a plurality of reinforcing blocks corresponding with the first cam slots, the first cam slots extend upwards to form an end portion adjacent to the image-side end of the cam barrel and then extend downwards, each reinforcing block is disposed beneath the end portion correspondingly to reinforce the end portion.

9. The image capturing device in claim 6, wherein the zoom lens further comprises a base, a fixing barrel and a driving device, the fixing barrel and the driving device are arranged on the base, the fixing barrel is configure to guide the moving barrel to move along the axis of the zoom lens, the driving device comprises a direct current motor and a step motor which are arranged on a same side of the fixing barrel.

10. The image capturing device in claim 9, wherein the zoom lens further comprises a guiding barrel, the guiding barrel is received in the fixing barrel, a plurality of second sliding pins extend outwards from the object-side end along the radius direction of the guiding barrel, the base defines a plurality of openings for receiving the second sliding pins respectively.

* * * * *

UNITED STATES PATENT AND TRADEMARK OFFICE
CERTIFICATE OF CORRECTION

PATENT NO. : 8,248,711 B2  
APPLICATION NO. : 12/699886  
DATED : August 21, 2012  
INVENTOR(S) : Li et al.

Page 1 of 1

It is certified that error appears in the above-identified patent and that said Letters Patent is hereby corrected as shown below:

Title Page, below Item (65) insert

-- [30]        Foreign Application Priority Data

Dec. 21, 2009  (CN) .........................200910311879.0 --

Signed and Sealed this  
Twenty-ninth Day of October, 2013

Teresa Stanek Rea  
*Deputy Director of the United States Patent and Trademark Office*